United States Patent Office 3,267,074
Patented August 16, 1966

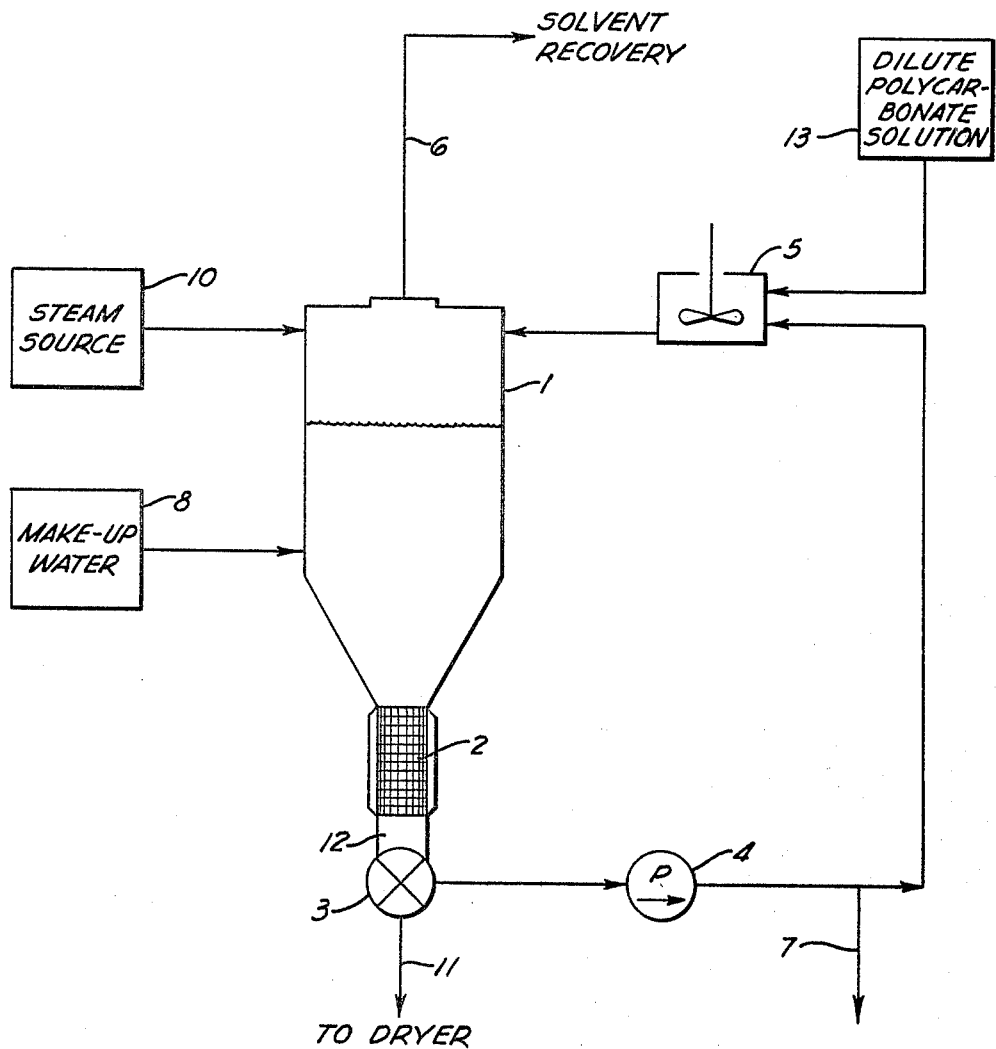

3,267,074
PROCESS FOR PRODUCING POLYCARBONATES
Noel V. Wood, Pittsburgh, Pa., assignor to Mobay Chemical Company, Pittsburgh, Pa., a corporation of Delaware
Filed Nov. 2, 1962, Ser. No. 235,010
10 Claims. (Cl. 260—47)

This invention relates to a method for the production of polycarbonates and more specifically to a novel method for recovery of solid polycarbonates from solutions.

There have been various methods used for the preparation of polycarbonate plastics. Suitable processes for preparing these polycarbonates are described in U.S. Patents 3,028,365; 3,043,800; 3,043,802 and in Canadian Patents 578,795; 594,805 and 611,970. The process disclosed in U.S. Patent 3,028,365 which involves the phosgenation of dihydroxy diaryl alkanes has been the most commercially used process. The resulting polycarbonate product in each of these above noted processes usually is in the form of a solution. It is desirable for molding, transporting and other purposes that the polycarbonate be recovered from the solution as a solid.

There have also been disclosed a number of methods for the recovery of polycarbonates from solution. Some of these recovery methods are by extrusion, by direct evaporation of the solvent from solution, by precipitation, and other separation means. In one precipitation method a stream of polycarbonate solution is sprayed into a mist or stream of boiling water, thereupon evaporating solvent from the solution. In order to insure that temperature conditions be kept constant, the components are slowly agitated upon contact. To insure this deliberate mixing, mixing devices having speeds not exceeding about 1800 r.p.m.'s have been used. This method has been limited commercially because the polycarbonates recovered have an extremely low bulk density. More important, however, is the fact that the polycarbonate recovered is in an undesirable fibrous form commercially impractical unless further processed and densified or compacted. The large volume and extremely low bulk density of this material requires further grinding, drying and other process steps before it can be extruded. Also, because of the non-uniformity of the particle size and because of the comparatively large volume of the particles, this polycarbonate product has been extremely difficult to work with especially when it is to be introduced into processing equipment to extrude and pelletize. Further because of this comparatively large volume of the product material, relatively bulky expensive blending equipment is required and transporting and handling problems are costly and complicated.

It is, therefore, an object of this invention to provide a method for the recovery of polycarbonate from a solution thereof which avoids the above noted drawbacks. It is another object of this invention to provide a process for the production of a polycarbonate material having a relatively high bulk density. Another object of this invention is to provide a process for the preparation of a polycarbonate in a commercially desirable physical form. Another object of this invention is to provide a process for the production of polycarbonates wherein the polycarbonate recovered has a comparatively small percentage of solvent remaining therein.

The foregoing objects and others which will become apparent from the following description are accomplished in accordance with this invention, generally speaking, by recovering polycarbonates from a polycarbonate solution by a process which comprises contacting said polycarbonate solution with a heated polycarbonate non-solvent in an area of high turbulence with an accompanying high shearing of the resulting mixed solution. The polycarbonate solution initially used may range from about a 1% to about a 30% or 40% polycarbonate solution by weight depending upon the temperature of the solution and other operating conditions. A critical step in the process of this invention is the injection of the polycarbonate solution into a highly turbulent stream of polycarbonate non-solvent maintained in a high shearing device. In contrast to the above noted prior art precipitation spray method, the polycarbonate recovered from the process of this invention is of a relatively high bulk density and may be directly fed to a pelletizing system. In addition, the present process has provided a simplified commercially adaptable method whereby substantially all the solvent may be removed from the final polycarbonate product. Also the product resulting from the process of this invention is in a much more convenient and uniform physical form than the heretofore produced polycarbonates. The resulting product is a somewhat granular polycarbonate having a more uniform melting capacity wihch correspondingly requires substantially smaller and more economical equipment for processing and handling.

A further important advance provided by the present invention is that it allows a separation of polycarbonate from solution at a comparatively low temperature. This is an especially important consideration for temperature-sensitive plastic such as polycarbonates which have a tendency to severely discolor when heated to elevated temperatures. Some other systems of separation of polycarbonates from solution such as extrusion systems require high operating temperatures and thus increase the likelihood of discoloration in the final product.

As noted above, various methods are known for producing polycarbonates and polycarbonate solution. One method, for example, involves the phosgenation of a dihydroxy diaryl alkane in a methylene chloride or similar solvent. This process is disclosed in detail in U.S. Patent 3,028,365. Various solvents may be used in this process. These solvents subsequently make up a large portion of the polycarbonate solution produced. Suitable solvents include sym-tetra-chloroethane, methylene chloride, bis - 1,2 - dichloroethylene, chloroform, 1,1,2 - trichloroethane, 1,2-dichloroethane, thiophene, dioxane, tetrahydrofuran, acetophenone, anisole, cyclophenanone, benzonitrile, dimethylformamide, nitrobenzene and the like. The present invention for illustrative purposes will be defined with reference to the use of a methylene chloride solvent. It should be understood, however, that this process is applicable to solutions containing other solvents than methylene chloride.

There are known many polycarbonate non-solvents. Some of these, for example, are water, hexane, heptane, cyclohexane, acetone, methyl cyclohexane, isoheptanes, ethyl acetate, toluene, trichloroethylene, carbon tetrachloride, nitromethane, acetonitrile, 1,1-dichloroethane and dialkyl carbonates such as diethylene carbonate and the like. These non-solvents may be used as the "heat carrier" of the present invention. The invention, however, will be hereinafter described with reference to the use of water as the non-solvent. Water is preferred as the non-solvent "heat carrier" and methylene chloride is preferred as the solvent of this invention since water is the easiest to handle and most economical and methylene chloride is of a comparatively low boiling point. It should be noted, however, that it would merely involve a matter of choice, design or expediency to use any of the above solvents or non-solvents in the present process. It is important that the solvent and non-solvent used be immiscible with each other to provide the desired separating effect.

The present invention provides a method for the continuous stripping of solvent from a polycarbonate solution and thereby recovering the polycarbonate therefrom. Violent agitation or shearing is necessary at the feed point of the polycarbonate solution to produce a relatively high bulk density material. This shearing is also required to avoid the sticky mass or agglomerated material resulting in the prior art precipitation processes. If there is not sufficient shearing of the solution, the resulting polycarbonate product will be an undesirable fibrous thread-like product. The high shearing is required at the point of contact of the polycarbonate solution and non-solvent and during devolatilization, while milder agitation will suffice in the remainder of the system. The prior art processes generally maintain a constant mixing temperature for slowly or deliberately mixing the non-solvent used with the dilute polycarbonate solution. The resulting solid polycarbonate product from this slow mixing process usually is a stringy agglomerate of extremely low bulk density. The shearing device of this invention provides a means for actually cutting the polycarbonate particles while in solution and resulting in a solid polycarbonate product having comparatively high bulk density. The shearing device of this invention should have an operation speed of at least 2000 r.p.m. and preferably from 2500 to 20,000 r.p.m. It is to be understood however, that any speed or any device which imparts a shearing action upon the polycarbonate solution treated is intended to be encompassed within the spirit of this invention. A "shearing device" is not to be confused with the heretofore used "mixing device" of the prior art. The shearing device used in this invention actually cuts the solution at an extremely high rate of speed, whereas mixers merely agitate or mix the components in the solution. Some of the shearing devices that may be used in the process of the present invention are:

"Charlotte Colloid Mill"—20 H.P. size; speed—3600 r.p.m.;
"Eppenbach Homogenizer"—15 H.P. size; minimum speed—3550 r.p.m.;
"Dispersator Mixer"—Series 3400; 5–20 H.P. size; up to 3600 r.p.m.;
"Dispersator Mixer"—Premier from ½ H.P.–10 H.P.; maximum speed—16,000 r.p.m.;
"Supraton"—30–80 H.P. size; speed 3600 r.p.m.

Each of the above devices may be used in the present invention depending, of course, upon the capacity of the system and the desired resulting sheared polycarbonate. Also in addition, the selection of the shearing device to be used will depend upon a variety of conditions such as concentration, temperature and of course as above noted, the capacity of the system. A further high speed shearing device which may be adapted for use in the process of this invention is described in detail in U.S. Patent 2,969,960. The polycarbonate solution must be injected directly into the shearing device so that the initial devolatilization of the solvent is rapid thus avoiding the sticky stage and also may be completed while an extremely high degree of shearing prevails. To provide the rapid devolatilization necessary to pass quickly through this sticky stage, it is essential that more than ample heat be available at the point of feed injection to avoid the sudden drop of temperature that would otherwise occur on flashing of the methylene chloride. The preferred manner of insuring adequate heat is to circulate said water to the feed injection point at a high enough rate so that the total heat requirements lower the water temperature only slightly. In addition, it is preferred that all of the water circulated should be concentrated as much as possible at feed point to increase the turbulence. This method provides a more economical means for the production of polycarbonates in a desirable final form. Not only must the polycarbonate polymer be essentially free of solvents, but the bulk density and the particle size must be such that subsequent drying and pelletizing operations are not adversely effected.

To further define the process of the present invention, reference will be made to the accompanying drawing. It should be understood that although specific conditions and components will be mentioned in reference to the drawing, the present invention is not limited to these specifics. FIGURE 1 illustrates a flow diagram of the process of this invention. Referring to FIGURE 1, the elements of this process include a flash drum tank or separating means 1 which serves as a means for separating solvent vapors and recirculating hot water. Also tank 1 provides a means for allowing the partially devolatilized poycarbonate a rather long residence time. Temperature of the water in tank 1 is controlled manually or with automatic instrumentation. The preferred method is to directly sparge filter live steam from steam source 10 into vessel 1. Alternatively, the hot water can be heated by a jacket coil or any other conventional heat exchanger. The hot water is controlled at temperatures in a range at least above the boiling point of the solvent used, and is circulated through a screen 2 at the bottom of vessel 1. The polycarbonate solid particles collect above the valve 3 in portion or chamber 12 and is easily withdrawn through line 11 and passed to a dryer. In place of this valve a star feeder or a dewatering screw conveyor or other types of desirable devices may be used. They may be automatic or manually operated to withdraw the dewatered solid polycarbonates.

Prior attempts by others to use a hot water stripping method have failed to obtain complete removal of solvent due to filtration of solids after the short once-through passage residence time of the polycarbonate. It is important to this invention that the solids have a comparatively long residence time in the system. The purpose of the screen as shown is to avoid recirculation of abrasive solids but at the same time provide a long residence time for complete devolatilization. An alternate of this process is to remove the screen 2 and let the solids circulate through the pump 4. This could have additional benefits in controlling particle size and bulk density of the final product. Proper solids residence time can be assured by controlling withdrawal of slurry at 7 to match polycarbonate feed at any desired slurry concentration. Either of the two above procedures will guarantee substantially complete removal of solvent. Thus the long residence time provides excellent removal of solvent and together with the shearing effect of this process result in a product of high bulk density.

The pump 4 recirculates the hot water at high enough rates to supply the required heat to the shearing device 5 to insure insignificant temperature drop when injecting the dilute polycarbonate feed solution from polycarbonate solution source 13. Although the purposes of clarity and simplicity, the following description and examples will define the dilute polycarbonate solution as a 10% solution. It should be understood that dilute polycarbonate solutions ranging from about 1% to about 30 or 40% polycarbonate may be used. For purposes of commercial expediency and practicality, it is preferred to use a solution from about 5% to about 20% polycarbonate. The high shearing device and above long residence time in the separator avoids extrusion of fibers leading to low bulk densities, as well as agglomerations as in the prior art processes. Solvent and a water slurry of polycarbonate particles are discharged into the flash drum 1. The solvent vapor and entrained water are condensed at 6 and the methylene chloride decanted and recycled to the polymerization step. Make-up water 8 is fed to maintain a constant level. The pump 4 recirculates the hot water at high rates through the shearing device 5.

The polycarbonate goes through a sticky stage in the early stages of evaporation of the solvent for uncertain reasons. This is believed, however, to be due to a narrow range of solvent concentration which occurs at a point where the polycarbonate dough or jell is so rich in solvent that it becomes viscous and sticky. This, of course, is the danger point with respect to agglomerate formation. If the polycarbonate solution is injected into a gently agitated body of hot water or a circulating stream of insufficient turbulence as in the prior art, sticky strands result. The success of the process of this invention depends upon an extremely high turbulence of the "heat carrier" liquid at the point of introduction of the polycarbonate solution. While theoretically this may be obtained by sufficiently high circulation rates, the preferred method shown in the drawing utilizes a high speed shearing device. The turbulence of the mixing (or heat carrying) liquid at the point of introduction of the polycarbonate can be calculated by what is commonly known as the Reynolds number. The Reynolds number can be defined as the product of the diameter of the channel used and the mass flow rate (pounds per hour per square foot) divided by the viscosity of the fluid. It can be calculated as follows:

$$\text{Reynolds number} = \frac{DG}{\mu}$$

wherein D is the diameter of the flow channel in feet

G is equal to $\frac{\text{Pounds}}{\text{Hour per square foot}}$ (Mass flow rate)

and $\mu$ is equal to $\frac{\text{Pounds mass}}{\text{Feet per hour}}$ (Viscosity)

A further discussion on Reynolds number may be found in "Chemical Engineers' Handbook" by John H. Perry, 3rd edition, 1950, pages 377–379.

It is required that the mixing (or heat carrying) liquid flow have at least a Reynolds number—1500, preferably up to about 7500. The turbulence effected is very desirable since it insures that the polycarbonate is kept in suspension (and does not agglomerate) after it leaves the shearing device.

The shearing device may be a high shear pipe line mixer, a centrifugal pump with an impeller altered for high shear or to be driven backwards. Some of the high speed devices that may be used are Eppenbach Dispersators, Supraton Dispersion Units, high speed Dispersators or other high speed devices. A suitably designed orifice in the circulating line with the solution injected just upstream may be satisfactory, however, the high speed mechanical shearing devices are preferred.

The following examples further define the specifics of this invention. Parts are by weight unless otherwise specified.

*Example 1.—Polycarbonate recovered by the conventional prior art of hot water spraying method*

A polycarbonate is made by the phosgenation of bisphenol A, 2,2-(4,4'-dihydroxy diphenyl) propane, using methylene chloride as the solvent. The resulting polycarbonate product made by this method is 10% by weight polycarbonate solution in methylene chloride solvent. The solution obtained is then divided into a plurality of equal portions and used in the process of this example and the following examples. This 10% polycarbonate solution is sprayed by means of a spray nozzle into a mist of hot water at the rate of 35 lbs./min. at a temperature maintained at about 90–95° C. The resulting mix is then collected in a 55 gallon drum containing hot water, maintained at a temperature of about 90–95° C. using a steam sparger. The water in the drum is agitated by a mixing apparatus rotating at about 1700–1800 r.p.m. The methylene chloride is evaporated and the separated polycarbonate recovered and separated from the water by means of a screen is a sticky mass. This collected polycarbonate product, after drying in a pan or tray dryer becomes a fluffy low density wool-like agglomerated mix. The particles obtained are non-uniform and bulky and are found to have a relatively low bulk density of up to about 0.2 gram/cc. The final form of this product because of its bulkiness and non-uniformity of size will be difficult to feed to an extruder in the final pellet production step. It is necessary that these fluffy wool-like portions be compressed before feeding to the extruder pelletizing device.

*Example 2*

A 55 gallon drum used as a flash drum equipped with a product collection screen at the bottom portion is filled about ½ full with water while sparging steam therein until a temperature of 90–95° C. is obtained. The water is then circulated throughout a piping system passing from the 55 gallon drum through a 30 g.p.m. centrifugal water circulation pump and then through a high speed shearing device such as, for example, an Eppenbach Disperser or a high speed Premier Dispersator and recycled back to the drum source. The high speed shearing device is maintained at a speed of about 7500–16,000 r.p.m. A portion of the polycarbonate solution as prepared by the method disclosed in Example 1 is conducted to the high speed shearing device by a polycarbonate feed line having a spray nozzle which fits in and extends into the high speed shearing device. The high speed shearing device in the process defined herein is a ½ horsepower Dispersator having a maximum speed of 16,000 r.p.m. One part of the 10% polycarbonate solution is injected directly into the eye of the Dispersator shearing device by the use of the spray nozzle and at the same time a highly turbulent stream of about 65 parts of hot water per 1 part of 10% solution is also passed into this high speed shearing device. The feed rate of the polycarbonate solution is about 40–160 lbs./hr. The run is conducted throughout under atmospheric pressure and is continued until a 10–20% slurry in water is obtained. This slurry is then continuously withdrawn from the system and dried in a tray dryer to obtain the resulting dried polycarbonate product. This resulting dried polycarbonate product is granular product of relatively uniform size, having a bulk density of about 0.6 grams/cc. The product is fed directly to a pelletizing system after drying without requiring any further compressing.

*Example 3*

The 55 gallon drum of Example 2 is replaced with a flash drum suitable for pressurized operation. This is fitted with a product collection screen at the bottom portion and is filled about ½ full with water while sparging steam therein until a temperature of 65–70° C. is obtained. The water is then circulated throughout the production system passing from the flash drum through a 30 gpm. centrifugal water circulation pump and then through a high speed shearing device such as, for example, a high speed Dispersator and Eppenbach Disperser and recycled back to the drum source. The high speed shearing device has a speed of about 7500–16,000 r.p.m. A portion of the polycarbonate solution as prepared by the method disclosed in Example 1 is conducted to a high speed shearing device by a polycarbonate feed line having a spray nozzle which fits into and extends into the high speed device. The high speed shearing means in the process defined herein is a ½ horsepower Dispersator having a maximum speed of 16,000 r.p.m. About one part of the 10% polycarbonate solution is injected directly into the eye of the Dispersator shearing device by the use of a spray nozzle and at the same time a high turbulence stream of about 22 parts of hot water is also passed into this high speed shearer. The feed rate of the polycarbonate solution is about 40–160 lbs./hr. The run is conducted throughout under pressure of 10 p.s.i.g. and is continued until a 10–20% slurry in water is obtained. This slurry is continuously withdrawn from the system and dried in a tray dryer to obtain the resulting dried polycarbonate product as a granular product having a relatively uniform size and an approximate bulk density of 0.6 gram/cc. The granular polycarbonate is directly fed to an extruder-pelletizing system after drying without any further required steps such as grinding or compressing.

*Example 4*

A 55 gallon drum having a product collection screen at the bottom portion is filled about ½ full with water while sparging steam therein until a temperature of 65–90° C. is obtained. The water is then circulated throughout the production system passing from the 55 gallon drum through a high speed shearing device such as, for example, "an Eppenbach Disperser or a high speed Dispersator and recycled back to the drum source. The high speed device has a speed of about 7500–16,000 r.p.m. A portion of the polycarbonate solution as prepared by the method disclosed in Example 1 is conducted to a high speed device by a polycarbonate feed line having a spray nozzle which fits into and extends into the high speed device. The high speed device in the process defined herein is a ½ horsepower Dispersator having a maximum speed of 16,000 r.p.m. One part of the 10% polycarbonate solution is injected directly into the eye of the Dispersator device by the use of a spray nozzle and at the same time a high turbulence stream of about 29 parts of hot water is also passed into this high speed shearing device. The feed rate of the polycarbonate solution is about 40–160 lbs./hr. Three runs were conducted using the same conditions of Example 2 except the pressure is adjusted to 2, 3 and 4 atmospheres. The process is not conducted under a pressure beyond 4 atmospheres since methylene chloride at 90° C. will not be super-heated or volatilized beyond 4.73 atmospheres. This slurry is continuously withdrawn from the system and dried in a tray dryer to obtain the resulting dried polycarbonate product. This resulting dried polycarbonate is a granular product having a relatively uniform size and comparatively high bulk density. The product is directly fed to a pelletizing system after drying without any further requirement step such as compacting.

*Example 5*

Additional runs which are conducted under the conditions and in a manner similar to the procedures of Examples 1 to 4 give a resulting granular polycarbonate product of desirable bulk density and size. The following conditions are used in these runs:

A. Temperature, 70° C.

| Run Number | 1 | 2 | 3 |
| --- | --- | --- | --- |
| Pressure, atm | 1 | [1] 1.34 | [2] 1.68 |
| Water Circulation Rate, lb./lb. 10% p.c. solution | 26.6 | 23.4 | 21.8 |
| Heat Required, B.t.u.'s/lbs. 10% p.c. solution (Based on 5° C. Δ T) | 239 | 210 | 196 |

[1] 5 p.s.i.g.
[2] 10 p.s.i.g.
NOTE.—P.c.=polycarbonate.

B. Temperature, 90° C.

| Run Number | 4 | 5 | 6 |
| --- | --- | --- | --- |
| Pressure, atm | 1 | [1] 1.68 | 2.09 |
| Water Circulation Rate, lb./lb. 10% p.c. solution | 65.7 | 33.4 | 25.6 |
| Heat Required, B.t.u.'s/lbs. 10% p.c. solution (Based on 5° C. Δ T) | 592 | 300 | 229 |

[1] 10 p.s.i.g.
[2] 25 p.s.i.g.
NOTE.—P.c.=polycarbonate.

The results of runs conducted under the above conditions will indicate a definite preference for run 5. It will be noted that at 90° C. and 1.68 atm. pressure, only about half the amount of heat is required in the system as compared to run 4 conducted under 1 atm. pressure. A substantial savings in a large commercial system would be realized using the conditions of run 5. The 5° C. temperature drop of this run is also desirable because if the temperature drop is too great the resulting solution agglomerates rapidly.

The foregoing description with reference to the drawing including the examples were given for purpose of illustration and not limitation. Other variations will become apparent to those skilled in the art upon a reading of the description of the invention. These variations are intended to be included within the spirit of this invention except as limited by the claims.

What is claimed is:

1. A method for recovering solid polycarbonate having a high bulk density from a solution thereof which comprises introducing concurrently into a high speed shearing chamber a polycarbonate solution and a turbulent stream of polycarbonate non-solvent heated above the boiling point of the polycarbonate solvent and having a Reynolds number of at least 1,500 to form a mixture comprising polycarbonate particles, polycarbonate solvent and polycarbonate non-solvent and thereafter passing said mixture to a separate vessel containing a polycarbonate non-solvent maintained at a temperature above the boiling point of the polycarbonate solvent to remove said polycarbonate solvent and form a polycarbonate-non-solvent slurry and thereafter recovering polycarbonate from said slurry.

2. The method of claim 1 wherein said dilute polycarbonate solution comprises from about 1–35% polycarbonate and the remainder methylene chloride.

3. The process of claim 1 wherein said non-solvent is hot water.

4. The method of claim 1 wherein said mixture is sheared at a speed of from about 2500 r.p.m. to about 20,000 r.p.m. in said shearing chamber.

5. The method of claim 1 wherein said mixture is sheared at a speed of from about 5000 r.p.m. to about 16,000 r.p.m. in said shearing chamber.

6. The method of claim 1 wherein said polycarbonate solution and said non-solvent are circulated in said shearing chamber as a highly turbulent stream having a Reynolds number of from about 1500 to 7500.

7. The process of claim 1 wherein the temperature throughout the system is maintained at about from 40 to 100° C.

8. The process of claim 1 wherein the temperature throughout the system is maintained at about from 65 to 90° C.

9. A method for the continuous recovery of solid polycarbonate having a high bulk density from a polycarbonate-methylene chloride solution which comprises introducing concurrently into a high speed shearing chamber said polycarbonate-methylene chloride solution and a highly turbulent stream of hot water heated above the boiling point of the methylene chloride and having a Reynolds number of at least 1500, to form a mixture comprising polycarbonate particles, methylene chloride and water, passing said mixture from said shearing chamber to a separate vessel containing water maintained at a temperature above the boiling point of the methylene chloride to remove the methylene chloride from said mixture, removing and recycling back to said vessel at least a portion of the water in said resulting mixture, leaving remaining thereby a polycarbonate-water slurry, removing said polycarbonate-water slurry from said vessel, and separating the polycarbonate from said slurry.

10. A method for recovering solid polycarbonate having a high bulk density from a solution thereof which comprises introducing concurrently into a high speed shearing chamber a polycarbonate solution and a turbulent stream of hot water heated above the boiling point of the polycarbonate solvent and having a Reynolds number of at least 1500 to form a mixture comprising polycarbonate particles, polycarbonate solvent and water, passing said mixture from said shearing chamber to a separate vessel containing water maintained at a temperature above the boiling point of the polycarbonate solvent to remove the polycarbonate solvent from said mixture, removing and recycling back to said vessel at least a portion of the water in said resulting mixture leaving remaining thereby a polycarbonate-water slurry, filtering the polycarbonate from said slurry thereby obtaining a polycarbonate filtered cake and thereafter drying said filtered cake to the desired form.

References Cited by the Examiner

UNITED STATES PATENTS 2,989,503 6/1961 Jibben _____ 260—47

FOREIGN PATENTS 897,201 5/1962 Great Britain.

OTHER REFERENCES

Chemical Engineering, November 1960, pages 174–177.

SAMUEL H. BLECH, *Primary Examiner.*